United States Patent [19]

Moore et al.

[11] 4,338,234

[45] Jul. 6, 1982

[54] SIZING COMPOSITION AND SIZED GLASS FIBERS AND STRANDS PRODUCED THEREWITH

[75] Inventors: L. Dow Moore; Balbhadra Das, both of Allison Park, Pa.

[73] Assignee: PPG Industries, Inc., Pittsburgh, Pa.

[21] Appl. No.: 156,460

[22] Filed: Jun. 4, 1980

[51] Int. Cl.³ .............................................. C08K 5/54
[52] U.S. Cl. ................................... 523/206; 428/391; 428/392; 523/416; 523/502; 523/504; 525/29; 525/101; 524/512
[58] Field of Search ............... 260/29.2 EP, 29.2 TN, 260/29.2 E, 29.6 H, 29.6 NR; 428/391, 392

[56] References Cited

U.S. PATENT DOCUMENTS

| | | | |
|---|---|---|---|
| 2,946,701 | 7/1960 | Plueddemann | 117/72 |
| 3,245,938 | 4/1966 | Dennis | 260/29.6 |
| 3,366,507 | 1/1968 | Wilkinson | 117/138.8 |
| 3,437,517 | 4/1969 | Eilerman | 117/126 |
| 3,449,281 | 6/1969 | Sullivan | 260/29.2 |
| 3,936,285 | 2/1976 | Maaghul | 65/3 C |
| 4,049,597 | 9/1977 | Motsinger | 260/18 EP |
| 4,126,729 | 11/1978 | Richardson | 428/389 |
| 4,131,693 | 12/1978 | Wendt et al. | 427/117 |
| 4,151,139 | 4/1979 | Hochreuter | 260/29.2 EP |
| 4,178,326 | 12/1979 | Stevenson et al. | 525/176 |
| 4,215,175 | 7/1980 | Tucker | 428/375 |
| 4,222,918 | 9/1980 | Zentner et al. | 260/29.2 EP |
| 4,235,764 | 11/1980 | Dereser | 260/29.6 WA |

FOREIGN PATENT DOCUMENTS

| | | |
|---|---|---|
| 1046870 | 1/1979 | Canada ........................... 117/198 |
| 955080 | 4/1960 | United Kingdom . |
| 1136548 | 5/1966 | United Kingdom . |
| 1138528 | 1/1969 | United Kingdom . |
| 1221639 | 2/1971 | United Kingdom . |
| 1250194 | 10/1971 | United Kingdom . |
| 1253936 | 11/1971 | United Kingdom . |
| 1271500 | 4/1972 | United Kingdom . |
| 1278777 | 6/1972 | United Kingdom . |
| 1375035 | 11/1974 | United Kingdom . |
| 1503926 | 3/1978 | United Kingdom . |
| 1550661 | 8/1979 | United Kingdom . |
| 1571099 | 7/1980 | United Kingdom . |
| 1590409 | 6/1981 | United Kingdom . |

*Primary Examiner*—Paul R. Michl
*Attorney, Agent, or Firm*—Kenneth J. Stachel

[57] ABSTRACT

An aqueous sizing composition, glass fiber strands having the dried residue of the aqueous sizing composition and processes for producing these articles are provided that enable the production of glass fiber reinforced polymeric materials having improved properties. In addition, improvements are obtained in the processability of using glass fiber roving in the production of sheet molding compound, bulk molding compound and thick molding compound. The sizing composition, sized glass fiber strands, processes, reinforced polymeric materials and improvements of this invention emanate from the use of epoxidized polar thermoplastic copolymers in aqueous sizing compositions that are substantially insoluble in the matrix polymer. The aqueous sizing composition has one or more cross-linkable film formers, one or more organosilane coupling agents and about 3 to about 12 weight percent of the aqueous sizing composition of the epoxidized polar thermoplastic copolymer. The epoxy copolymer has about 3 to about 10 parts of epoxy functionality per 10 parts of the functionality of the other polymer material in the copolymer. Also the epoxy copolymer has a glass transition temperature (Tg) of from ambient temperature to about 50° C. The sizing composition can also have additional additives like lubricants, plasticizers, emulsifiers, urea formaldehyde condensates, and the like. The aqueous sizing composition is applied to glass fibers during their formation, and the sized glass fibers are gathered into strands and dried. A plurality of the dried, sized glass fiber strands are gathered, dried and collected for use as reinforcement in polymeric materials.

30 Claims, No Drawings

SIZING COMPOSITION AND SIZED GLASS FIBERS AND STRANDS PRODUCED THEREWITH

The present invention is directed to a sizing composition to produce sized glass fiber strands, providing for the facile cleaning of equipment and devices involved in the production of the sized glass fibers, providing improved wet-out for the sized glass fiber strands and providing improved ribbonization between a plurality of sized glass fiber strands. More particularly, the present invention is directed to obtaining the characteristics and properties of improved ribbonization, more facile cleaning of equipment and improved wet-out for glass fiber strands sized with a reduced migrating type sizing composition that is substantially insoluble in the polymer matrix that the sized strands are to reinforce.

It is well known in the art to produce glass fiber strands for use as reinforcement for polymeric materials by drawing the fibers at a high rate of speed from molten cones of glass from tips of small orifices in a platinum device called a bushing. In order to protect the glass fibers from interfilament abrasion during formation and during further processing and to make them compatible with the polymeric materials, like thermosetting materials, a sizing composition is applied to the glass fibers during their formation. The sizing composition conventionally contains lubricants, film formers, coupling agents, wetting agents, emulsifiers and the like. Conventionally, the sizing composition is applied to the glass fibers that are subsequently gathered into one or more continuous glass fiber strands on a forming package. A plurality of forming packages are dried to remove moisture and cure the sizing composition. A particularly useful type of sizing composition is one that gives reduced migration of the size from the inside to the outside of the forming package during drying.

An example of such a sizing composition is taught in U.S. Pat. No. 4,029,623 (Maaghul) having two types of polyester resins, coupling agents, a thermoplastic polymer and plasticizer. The first polyester resin is a water solubilized condensation, cross-linkable, polyester resin that is insoluble in aromatics solvents. The second polyester resin is insoluble but dispersible in water but insoluble in the first polyester resin. In addition, the sizing composition has the plasticizer and two silane coupling agents and a vinylacrylic copolymer thermoplastic polymer of sufficiently low molecular weight to impart pressure sensitive adhesive characteristics to the sizing composition. This sizing composition is substantially insoluble in polyester and vinyl ester resin systems.

In the application of sizing compositions to glass fibers during their formation, some of the sizing composition is sprayed onto surrounding surfaces. These surfaces include support and separation devices and production equipment used in forming glass fibers. If the sizing composition has components with limited water solubility or has components that have been solubilized in water with the aid of a volatile material, the sprayed sizing composition once dried on the surrounding surfaces is difficult to remove. The intractable, dried sizing composition has to be removed by scraping or by hydrolyzing, which is the use of a high pressure jet of water. The substantially insoluble, and limited migration sizing compositions such as that taught in the Maaghul patent, U.S. Pat. No. 4,029,623, is especially susceptible to this problem of being difficult to clean from surfaces surrounding the forming operation and forming equipment.

Sized glass fibers in the form of strand, mat and especially chopped glass fiber strands, are especially useful in the production of glass fiber reinforced polymeric materials. Examples of the preparation of these reinforced polymeric materials include processes of preparing and molding sheet molding compound (SMC), bulk molding compound (BMC) and thick molding compound (TMC).

An example of the preparation of such compounds is the preparation of SMC. This occurs by placing a film of polymer, usually unsaturated polyester resin, or vinyl ester resin premix having such additives as catalysts, pigments, extenders, and thickeners on a sheet with a nonadhering surface. The film on the sheet has a uniform thickness and the sheet with the uniform film travels on a conveyor belt. Chopped glass fiber roving strand or mat is uniformly deposited onto the polymer film. A second nonadhering sheet having a second polymer premix film is overlaid onto the first sheet so the second polymer premix film contacts the first polymer premix film with the glass fibers thereon. The sandwiched material is kneaded with a plurality of rollers having various configurations to uniformly distribute the glass fibers throughout the polymer premix. The sandwich is then taken up on a roll and can be used in subsequent molding operations. The glass content in the sheet molding compound is generally between 25 and 45 percent by weight of the compound.

In the production of SMC, BMC and TMC compounds the chopped glass fiber strands must properly contact the polymeric matrix material. One measure of this contact is referred to as "wet-out," which means flowability of the polymer matrix material through the glass fiber strand mass to obtain near complete encapsulation of the entire surface of each glass fiber strand in the compound. Therefore, wet-out during compounding is a measure of the apparent intimacy of contact between the polymeric matrix and the glass fiber strand. If the glass fiber strands are not immediately wet-out following compounding with the polymeric material, it may be expected that they will wet-out on aging due to the increase of the viscosity of the compound. This may lead to adverse effects in the processability, molding characteristics and surface properties of the final molded polymeric material. Another measure of this proper contract is referred to as "wet-through" or "flow-through." This refers to the speed with which the matrix polymer can penetrate into the mass of glass fiber strands in compounding the molding compound. It is desired to have a high degree of wet-through in molding compounds like SMC in order that the final physical properties of the molded composites and the processability thereof are at their maximum levels.

In producing molded SMC, BMC and TMC composites, the obtainment of uniform, low ripple, and smooth surfaces for the molded composite is influenced by the solubility of the sizing composition on the glass fiber strands in the polymer matrix material. In these molding compounds, the use of sized glass fiber strands having a sizing composition that is substantially insoluble in the polymer causes the majority of sized glass fiber strands to remain intact rather than filamentizing into their component fibers. This integrity of the strand must be maintained through the multitude of forces and conditions the glass fiber strands experience during the preparation of the molding compounds. The ability of the strand to maintain its integrity through the process of preparation of the compounds guards against filamentizing and the consequent formation of fuzzballs and the resultant loss in surface characteristics of the molded composite.

At some point in the process of preparing the molding compounds, the sized glass fiber strands are fed into the compounding machinery. Usually the sized glass fiber strands are fed into the machinery as roving and subsequently chopped to contact the polymer. Roving is a braided rope formed by combining in a parallel array a plurality of glass fiber strands taken from their forming packages. The combined strands are wound on to a rotating drum to collect a roving ball. When the roving is removed from the ball to be fed into the compounding or composite-forming machine, it is conveyed through guide eyes and perhaps tensioning devices. During this conveyance the roving should have good integrity or ribbonization. This integrity or ribbonization refers to the strands in the roving sticking together while being conveyed from the supply package to the machinery. Good ribbonization leads to better utilization of the roving by reducing the number of dangling or tangled strands and by reducing the generation of static.

It is an object of the present invention to provide a sizing composition that is used to produce sized glass fiber strands having improved properties of wet-out and wet-through when used to reinforce polymeric materials.

It is an additional object of the present invention to provide a sizing composition for glass fibers that is substantially insoluble in polymeric matrix materials and that contains a polymeric film former that is water solubilizable with the assistance of a volatile or fugitive material, but where the sizing composition is more easily removed from processing equipment and surfaces surrounding the glass fiber forming operation.

It is another object of the present invention to provide a sizing composition for glass fibers that produces sized glass fiber strands having improved ribbonization when a plurality of strands are combined into a fascicle, or roving.

It is a further additional object of the present invention to provide sized glass fiber strands having improved processability in producing glass fiber reinforced polymeric materials.

It is another additional object of the invention to provide cross-linkable polymeric material reinforced with glass fiber strands where the reinforced material has improved physical properties.

SUMMARY OF THE INVENTION

The aforementioned objects of invention and other objects inherent from the following disclosure are accomplished by the use of a particular amount of a class of thermoplastic polymers in a particular type of sizing composition for treating glass fibers.

The invention in its broadest aspects comprises a sizing composition for glass fibers that has one or more cross-linkable film forming polymers that make the sizing composition substantially insoluble in, but compatible with, the matrix polymer that the sized glass fiber strands are to reinforce where the sizing composition has present 3 to about 12 weight percent of an epoxidized polar thermoplastic copolymer. The copolymer has about 3 to about 12 parts of epoxy functionality for 100 parts of material selected from vinyl acetate, acrylate, polyurethane condensate repeating unit, polyester condensate repeating unit, and polyamide condensate repeating unit. The epoxidized polar thermoplastic copolymer has a glass transition temperature (Tg), as determined by nuclear magnetic resonance peak ratio, in the range of ambient temperature of processing glass fiber strands in preparing molding compounds to about 70° C. Usually the ambient temperature is above about 18° C.

The use of the terms "substantially insoluble" in the matrix polymer refers to matrix polymers used in producing SMC, BMC and TMC compounds. Generally, these polymers are unsaturated polyester resins and vinyl ester resins. Substantially insoluble means about less than 50 percent soluble in organic solvents that simulate the chemical nature of the matrix polymer. Non-exclusive examples of these solvents include acetone, toluene, or styrene. The substantial insolubility occurs from the presence of one or more cross-linkable film forming polymers in the sizing composition. These film-formers are present in a total amount greater than the amount of epoxidized polar thermoplastic copolymer in the sizing composition.

The use of the term "compatibility" refers to the sizing composition being capable of forming chemical, physical chemical, or mechanical bonds to at least a minor degree with the matrix polymer. A non-exclusive example of compatibility is the degree of solubility of the substantially insoluble sizing composition. Even the minor degree of solubility permits some interaction between the sizing composition on the sized glass fiber strands and the matrix polymer that leads to compatibility.

In a narrower aspect of the present invention, the epoxidized polar thermoplastic copolymer is used in an amount of 3 to about 12 weight percent of an aqueous sizing composition also having:

1. Polyester resin; that is, a water solubilizable, condensation, cross-linkable unsaturated polyester resin salt, which is substantially insoluble in aromatic solvents when cross-linked;

2. Another polyester resin that is unsaturated, water dispersible, polyester resin insoluble in the first polyester resin;

3. A plasticizer included in the composition to provide flexibility to the glass fiber strand and to control the coalescence of the polymers on the strand to form a uniform fiber;

4. A coupling agent which is used to couple the glass to the resin matrix; that is, a dual-coupling agent system wherein both coupling agents are silanes;

The water solubilizable polyester resin salt can be solubilizable with the use of nitrogenous base compounds like the volatile compound, ammonia or amine compounds.

The sizing composition is applied to the glass fibers by any process and apparatus known to those skilled in the art. The sized glass fibers are gathered into one or more glass fiber strands and wound into a package of glass fiber strand or strands. This package is then dried at conditions known to those skilled in the art to produce glass fiber strands having a dried residue of the sizing composition. A plurality of the glass fiber strands having the dried residue of the sizing composition are gathered together to form a roving package of numerous glass fiber strands. After formation of the roving package, one or a plurality of roving packages are heated to a temperature above about 212° F. (100° C.).

This heating can also be performed during formation of the roving before or after the plurality of glass fiber strands are gathered together. The roving having been heated and having glass fiber strands with the dried residue of the sizing composition can be used in the form of continuous glass fiber strands, chopped strands and continuous, chopped or woven glass fiber strand mat for reinforcing polymeric materials such as thermosetting polyester resins and vinyl esters.

DETAILED DESCRIPTION OF INVENTION

Before describing the preferred embodiment of the present invention, a general description of the composition, sized glass fiber strands, bundle of sized glass fiber strands, and glass fiber reinforced polymeric materials in their broadest aspects are given below.

The sizing composition in which the epoxidized polar thermoplastic copolymer can be used is one that has one or more cross-linkable film formers. Non-exclusive examples of the cross-linkable film formers include: addition polymers and copolymers and interpolymers with unsaturation capable of cross-linking in the presence of free radicals, like polyvinyl acetate and acrylic polymers, or copolymers like vinyl acetate-N-metholacrylamide; and condensation polymers, copolymers and interpolymers having unsaturation or having terminal and/or pendants functional groups capable of cross-linking with nitrogenous compounds or monomers, for example, polyesters, epoxies and polyurethanes.

The sizing composition has an amount of one or cross-linkable film formers sufficient to make the sizing composition in the dried state substantially insoluble in the matrix polymer. The substantial solubility is about less than 50 percent solubility and preferably about 1 to about 35 percent soluble. The cross-linkable film formers may be water solubilizable or water dispersible for use in the aqueous sizing composition. If the cross-linkable film former is water solubilizable, the curing time and degree of curing can be adjusted by selection of nitrogenous base compounds to solubilize the polymer. If the nitrogenous base is a volatile material, the resulting dried sizing composition is easily cleaned from surfaces surrounding the operation where the sizing composition is applied to the glass fibers during their formation.

In addition to the one or more cross-linkable film formers, the sizing composition may contain coupling agents, lubricants, plasticizers, surfactants, non-cross-linkable film formers, film former modifiers and the like.

The epoxidized polar thermoplastic copolymer is present in the sizing composition in an amount of 3 to about 12 weight percent of the aqueous sizing composition or about 10 to about 50 weight percent of the nonaqueous components of the composition. The copolymer is present always as a minor constituent of the sizing composition compared to the amount of film formers present. This amount is important in order to get improved wet-out of the sized glass fiber strands. The amount is also necessary to obtain improved cleanability when the size contains a water solubilized cross-linkable film former that dries to a relatively water insoluble material. The amount is necessary in this case since it reduces the amount of the water solubilized, cross-linkable film former present in the size composition per a given solids content of the composition. This makes the dried sizing composition less intractable to cleaning from equipment surfaces.

As mentiond above, the copolymer can be epoxidized polyvinylacetate, epoxidized polyacrylate, including various acrylates, which are esters of acrylic or methacrylic acid, like methyl methacrylate, methyl acrylate, ethyl methacrylate, 2-ethylhexyl acrylate, butylacrylate and the like; epoxidized polyesters; epoxidized polyamides; and epoxidized polyurethanes, like thermoplastic aliphatic and aromatic polurethanes prepared from condensation polymerization of an aliphatic or aromatic diisocyanate and diol. The copolymer can be formed by emulsion or suspension polymerization and may contain small amounts of various polymerization additives like stabilizers and surfactants. The copolymers exist in aqueous emulsions having varying amounts of solids. In the copolymer the amount of epoxy functionality is in the range of about 3 to about 12 parts per 100 parts of the other copolymer. If there are less than three parts, the copolymer will not be sticky enough to give good ribbonization. If there are more than 10 parts epoxy, the copolymer will be too sticky for processing.

When the sizing composition contains a water solubilized cross-linkable, unsaturated polyester resin, a water dispersible unsaturated polyester resin, a plasticizer, and one or more silane coupling agents, a polyvinyl acetate acrylic thermoplastic polymer has been used in an amount of about 1 to about 6 weight percent. In such a sizing composition, the epoxidized polar thermoplastic copolymer in an amount of 3 to about 12 weight percent of the sizing composition is substituted for the polyvinylacetate acrylic thermoplastic copolymer. In this substitution the amount of the epoxidized polar thermoplastic copolymer is higher than the amount of polyvinylacetate acrylic copolymer. For instance, if the sizing composition had 1 weight percent of the vinylacetateacrylic copolymer, then three times that amount or 3 weight percent of the epoxidized solar thermoplastic copolymer is used.

The description of the meanings of terms "water soluble resin," "water dispersible resin," and "substantially insoluble," along with the description of the water-solubilized polyester resin, the water dispersible polyester resin, plasticizer, and coupling agents can be gleaned from U.S. Pat. No. 4,029,623 (Maaghul), which is hereby incorporated by reference.

In general, the amounts of the polyester resins, plasticizer, and silane coupling agent system are similar to those described in U.S. Pat. No. 4,029,623 calculated in percent by weight of either nonaqueous solids or aqueous sizing composition and herein incorporated by reference. For example, the amount of the one or more silane coupling agents can be from about 0.1 to about 5 percent by weight based on the total aqueous sizing composition for each coupling agent, or up to 20 weight percent based on the nonaqueous components of the sizing composition for the one or more coupling agents. An exception is that in using the amount of the epoxidized polar thermoplastic copolymer, to be in the range of 3 weight percent to about 12 weight percent of the composition in producing a total solids content within the range of 2 percent to 30 percent by weight, the amount of the other ingredients in the composition will decrease. This decreases the amount of water solubilizable polyester, thereby making the dried sizing composition easier to clean from equipment surfaces. An epoxidized polar thermoplastic copolymer found particularly suitable for this type of sizing composition is an epoxidized polyvinyl acetate copolymer. The amount of epoxy functionality in the copolymer is in the range of about 3 parts to 12 parts per 100 parts of polyvinyl acetate. A suitable epoxidized polyvinyl acetate copolymer is that which is available from National Starch, Bridgewater, N.J. under the trade designation "25-1971." Another example is the epoxy polyvinylacetate copolymer avilable from National Starch under the trade designation "Resyn NSR-3362-53." Another epoxy polyvinylacetate that is useful is that available from H. B. Fuller Company under the trade designation "PN-3013."

Additional additives that can be added to the sizing composition include such additives as flexibilitizing agents, film former modifiers, wetting agents, stabilizers and curing agents. One particular useful additive that is added to the composition is a urea formaldehyde condensate such as that available from Monsanto Chemical Company under the trade designation "Resimene X970," which is used in an amount in the range of about 0.05 to about 3 weight percent of the aqueous sizing composition. Another helpful additive that is added is an emulsifier that is used to produce an emulsion of the amino-silane coupling agent and the polyester resin that is water dispersible. A particular useful emulsifying agent is that commercially available under the trade designation "Abex 18 S," which is an anionic emulsifier having a solids content of 35±1.70 and a pH of 7.5 to 8.5 at 25° C., and which is sold by Alcolar Chemical Corporation.

The plasticizer which is preferably incorporated into the emulsion of the silane and the water dispersible polyester resin, can be incorporated into the sizing composition in an amount necessary to give an amount in the aqueous sizing composition of about 2 percent to about 12 percent or by weight based on the total aqueous size composition. A particularly advantageous plasticizer is tricresyl phosphate. Other plasticizers known to those skilled in the art may be utilized so long as they impart the necessary properties of flexibility and processability to the glass fiber strand and roving formed therefrom and to aid in the coalescense of the solids in the sizing composition. Typical of other plasticizers are dioctyl phthalate, dibutyl phthalate, ethyl ortho-benzol benzoate, trixylenol phosphate and like.

In addition, any emulsifying agent known to those skilled in the art can be used, such as anionic, cationic or nonionic emulsifying agents. These types of emulsfying agents are known to those skilled in the art of preparing and using sizing compositions for glass fibers. Generally, the amount of all the additives, including the emulsifiers that are well known to those skilled in the art, falls within the range of about 1 weight percent to about 17 weight percent of the total solids content of the sizing composition although higher amounts can be used.

The sizing composition of the present invention can be prepared by any method known to those skilled in the art and can be applied to glass fibers by any method known to those skilled in the art. Generally, the water solubilized polyester resin solution can be diluted further with water. The solubilization of the water soluble polyester resin can be accomplished by means of the addition of an amine, which is capable of forming a salt with the pendant and/or terminal carboxyl groups of the polyester chain. Typically, triethyl amine, dimethyl ethanol amine, ammonia and the like can be utilized in solubilizing the polyester resin providing the solubilizing agent can be dissociated from the sizing composition and evaporated at acceptable curing temperatures and times, i.e., about 120° to about 177° C., in about two to about 24 hours. The curing time and degree of curing of the polyester resin can be adjusted by the selection of the nitrogenous base used to solubilize the polyester resin. A high boiling amine, i.e., dimethyl ethanolamine, will require substantial time and temperature to fully dissociate from the strand, and if complete cure of the size is not desired, complete association of the amine will not be conducted. If a low boiling solubilizing base, e.g., ammonia is used, cure times and temperatures can be substantially reduced.

To this water solution there is added the second polyester resin to form a dispersion. The water and the first polyester resin which had been solubilized forms a continuous phase of the dispersion and the second polyester resin forms a dispersed phase of the dispersion. This physical relationship between the first polyester resin and the second polyester resin prevents the migration of the sizing composition during drying. To the combination of the polyester resins there is added the other ingredients included in the plasticizer, the silane coupling agents, the epoxidized polar thermoplastic copolymer which is the thermoplastic pressure sensitive polymer, and preferably the urea formaldhyde condensate curing agent, any anti-foaming agent and emulsifiers. The resultant mixture is diluted to the desired concentration.

The method of preparing the sizing composition involves adding a predetermined amount of water to a mix tank equipped with an agitator, then, the amino silane is added to the mixed tank with agitation. Next, an amount of water is charged to an emulsion tank equipped with a high shear Eppenbauch agitator. The anionic emulsifier is added to the emulsion tank along with the sequential addition of the plasticizer to the emulsion tank with agitation. The agitation is continued until a homogenous emulsion is obtained. Water is then charged to a pre-mix tank equipped with an agitator and the water solubilized polyester resin is added with agitation. To a second pre-mix tank there is charged with agitation acetic acid and water and the second silane coupling agent. The contents of the emulsion tank, the first pre-mix tank and the second pre-mix tank were charged sequentially to the mix tank and agitated until homogeneous at which time the epoxidized polar thermoplastic coplymer is added to the mix tank after being diluted with water. A total volume of the sizing composition is then brought to the desired concentration about 2 to about 30 weight percent solids, and adjusted to a pH in the range of about 3 to 7.

Another method of forming the sizing composition involves combining the polyester resin that is water dispersible, having free pendant and/or terminal carboxyl functionality with an amino-functional silane, which is in the unhydrolyzed state or partially hyydrolyzed state. The unhydrolyzed or partially hydrolyzed amino-functional silane may be a mixture of amino-functional silanes that are unhydrolyzed or contain less than three hydroxyl groups attached to the silicon atom. In this method of preparing the sizing composition, which is especially useful for producing high solids, 18 to 30 weight percent composition, the amino-functional silane in the unhydrolyzed and/or partially hydrolyzed state is added directly to the water dispersible polyester resin having terminal carboxyl functionality. Then, the emulsifying agent and plasticizer are added to water, and the mixture of polyester resin and amino-functional silane is added to this solution containing the emulsifying agents and plasticizer in an emulsification tank equipped with a high shear Eppenbauch agitator or any other emulsification vessel known to those skilled in the art. To this emulsion there is added a polyester resin having free pendant and terminal carboxyl functionality that is water solubilized and that has been diluted with water. Also added to the emulsion is the hydrolyzed second silane coupling agent. After the addition of the second silane coupling agent, the epoxidized polar thermoplastic copolymer in water is added to the emulsion mixture.

In alternative embodiments the amino-functional silane is added in the unhydrolyzed or partially hydrolyzed state to a polyester resin having free pendant and terminal carboxyl functionality that is in an aqueous medium and then this mixture is added to an emulsion of a polyester resin having terminal carboxyl functionality and an emulsifying agent and plasticizer to form the emulsion polyester resin or polyester resin system with the amino-functional silane. Also, alternative embodiments include adding part of the unhydrolyzed silane to one or the other of the polyester resins and then adding the remaining amount of the unhydrolyzed silane to the other polyester resin.

The sizing composition provides glass fiber strand with about 1.0 to about 3.5 percent by weight of the dried sizing composition on the strand based on the total weight of the glass and with the dried residue of the sizing composition thereon.

Glass fibers can be drawn from a bushing having molten glass capable of forming glass fibers such as borosilicate glass like "E-glass" or low pollution derivatives thereof andd even magnesium-aluminum silicate eutectic glass compositions. These glass fibers can be sized with any apparatus known to those skilled in the art like rollers or pads with the sizing composition of present invention. The individual sized glass filaments are gathered into strands and collected onto a forming tube mounted on a rotating collet. The forming tube contains sized glass fiber strand or strands, and a plurality of the forming tubes, as formed above, can be dried in an oven at a temperature above about 100° C., for longer than 1 hour, preferably 133° C., for eleven hours to produce sized glass fiber strands having the dried residue of the sizing composition of the present invention.

A plurality of the dried forming packages can be mounted on a creel, braided into roving, heated and collected on a rotating spindle to form a roving ball. The heating can occur before or after the strands are gathered into the roving. Since the strands do not retain heat for a long period of time, it is better to heat the strands after they are gathered. This heating, referred to as post-baking, enables the epoxidized polar thermoplastic polymer to flow to give the strands good ribbonization. The heating can also be performed after the roving package is formed. This latter heating method is preferred for small roving packages. The temperature of the heating step is above about 100° C. for a suitable period of time to cause the epoxidized polar thermoplastic polymer to flow. Preferably the heating is at about 125° C. for about 4 hours.

The end of a plurality of such roving packages or balls can be threaded into machinery for producing sheet molding compound, BMC compound, and TMC compounds or composites. The dried sized glass fiber strands in the form of roving can be used in any form to reinforce the polymeric materials and sheet molding compound, BMC composites and TMC composites. Examples of such forms would include chopping the roving into chopped strands, weaving the roving into woven product, or laying the roving down in a moving belt to form a mat although it is preferred to use chopped roving strands to form a mat. The glass fiber strands in any form are combined with the polymeric material that is to form the matrix to produce the glass fiber reinforced polymer.

DESCRIPTION OF THE PREFERRED EMBODIMENT

In the preferred embodiment of the present invention, the amount of the water soluble polyester resin having pendant and terminal carboxyl functionality is used in an amount less than the amount of the water dispersible polyester resin. It is also preferred that the water solubilizable polyester resin is Resin A of U.S. Pat. No. 4,029,623 (Maaghul) hereby incorporated by reference, and that the water dispersible polyester resin is Resin B of U.S. Pat. No. 4,029,623. Also, it is preferred to use a sizing composition having a higher solids content in a range of about 18 to about 25 weight percent of the sizing composition. Also, it is preferred in preparing a sizing composition that the unhydrolyzed amino-functional silane be added to the water dispersible polyester resin, Resin B, having terminal carboxyl functionality. Also, it is preferred that the epoxidized polar thermoplastic copolymer is epoxidized polyvinyl acetate copolymer. Also, it is preferred to add about 0.5 to about 3 weight percent of urea fomaldehyde condensate resin. Therefore the preferred sizing composition of the present invention comprises:

about 1 to about 12 weight percent of water solubilizable unsaturated polyester resin;

about 2 to about 12 percent by weight of water dispersible unsaturated polyester resin, wherein the amount of water dispersible polyester resin is greater than the amount of water solubilizable polyester resin;

about 2 to about 12 percent by weight of a plasticizer;

about 0.1 to about 2.0 percent by weight of an aminosilane coupling agent, which is combined with the water dispersible polyester resin in preparing the sizing composition;

about 0.1 to about 2.0 percent by weight of a second silane coupling agent;

about 0.5 to about 3 weight percent of urea formaldehyde condensate resin;

3 to about 12 weight percent of epoxidized polyvinylacetate copolymer, and a minimum of 70 percent by weight of water. These same amounts can be used for any broader class of a similar components for the sizing composition.

The sizing composition is preferably applied to glass fibers that are gathered into strands on forming packages that are dried at around above 100° C. and produced into roving. The roving is post-baked at around 125° C. for around 4 hours. The roving is then used to produce SMC, BMC and TMC compounds and composites, where the roving is chopped into chopped strands. Further illustrations of the preferred embodiment of the present invention are obtained from the following examples.

EXAMPLE I

A twenty gallon (75.7 liter) amount of the sizing composition of the present invention was prepared in the following manner.

An amount of 5,775 grams of water dispersible polyester resin in an aqueous solution as 76 weight percent solids (RS-5974 available from PPG Industries, Inc.) was combined with 375 grams of gamma-aminopropyltriethoxy silane (A-1100 available from Union Carbide Corp.) in an emulsification vessel having an Eppenbauch mixer. To this mixture there was added 15,200 ml of water and 253 grams of anionic emulsifier (Abex 18X), and 253 grams of tricresyl phosphate plasticizer (Phosphlex 179A) with agitation to form an emulsion.

To this emulsion there was added 11,190 grams of water solubilizable polyester resin with pendant and terminal carboxyl functionality (Freeman resin 40-5018) in 13,700 ml of water.

To a premix tank there was charged with agitation 6,800 ml of water, 4 grams of acetic acid and 600 ml of alpha-methacryloxypropyltriethoxy silane. The contents of this premix tank are added to the contents of the emulsification tank with agitation. An amount of 9,290 grams of epoxidized polyvinylacetate copolymer (National Starch Resyn N25-1971) in 7,800 ml of water was added to the contents of the emulsification tank. In addition, an amount of 1,267 grams of urea formaldehyde resin (Freeman 0202) in 4,430 ml of water was added to the contents of the emulsification tank with agitation. To this mixture there was added 8 ml of an antifoaming agent (SAG 470).

The sizing composition had solids content of 19 to 20 percent and a pH of 6.0.

The following table shows the components in weight percent of the sizing composition:

TABLE I

| | |
|---|---|
| Water dispensible polyester resin | 5.65 |
| Water solubilizable polyester resin | 4.33 |
| Anionic emulsifier | 0.32 |
| Tricresol phosphate | 0.32 |
| Aminopropyltriethoxy silane | 0.48 |
| Methacryloxypropyltri methoxy silane | 0.77 |
| Epoxidized polyvinyl acetate copolymer | 6.1 |
| Urea formaldehyde resin | 1.65 |
| Deionized water | 80.38 |

The above sizing solution provides a glass strand with about 2.05±0.15 percent by weight of the dried sizing composition on the strand based on the total weight of the glass with the dried residue of the sizing composition thereon.

The sizing composition was used to size K-37 glass fiber strands during forming where the collet was rotating at 4,500 revolutions per minute. A plurality of forming packages as above formed were dried in an oven at 255° F. (124° C.) for 4 hours. Twelve of the packages were mounted on a creel, braided into roving, and collected on a rotating spindle to form a roving ball and post baked at 255° F. (124° C.) for 4 hours.

The roving ball was used to produce molded bulk molding compound and sheet molding compound composites which were tested for tensile strength, flexural strength and notched Izod. These values are compared to molded BMC and SMC panels produced with sized glass fibers commercially available from PPG Industries, Inc. as 516 roving. The results are shown in Table II.

TABLE II

| | | | Example I ½" BMC | Type 516 ½" BMC | Example I SMMC | Example I SMC | Type 516 SMC |
|---|---|---|---|---|---|---|---|
| 9000 psi minimum | Tensile (psi) | Avg. | 5350 | 4570 | 10,500 | 10,500 | 11,200 |
| | | Range | 3700–6210 | 2670–6230 | | | |
| | Flexural (psi) | Avg. | 18,100 | 14,800 | 27,300 | 28,600 | 25,200 |
| | | Range | 17,100–19,500 | 10,000–19,500 | | | |
| | Flex. Mod (psi × 10$^6$) | Avg. | 1.71 | 1.61 | 1.53 | 1.72 | 1.59 |
| | | Range | 1.68–1.81 | 1.25–2.06 | | | |
| 3.5 ft./lbs. minimum | Notched Izod ft./lbs. | Avg. | 5.6 | 5.4 | 13.3 | 15.3 | 14.4 |
| | | Range | 3.9–6.9 | 4.6–7.1 | | | |

In these tests the samples were taken from molded parts having glass contents for all BMC samples tested at 24 percent. The BMC compounds were mixed on Baker-Perkins mixer. The SMC compounds had 26.5 percent glass. The tensile, flexural, flexural modulus and Izod tests were conducted in the same manner according to standard procedures.

Table III presents test results for wet-through and wet-out of sized glass fiber strands. The sized glass fiber strands having the dried sizing composition of Example 1 was compared to commercially available 516 glass fiber strand roving from PPG Industries, Inc. Both strands were tested in sheet molding compound.

Wet-through is tested following compaction of SMC and prior to wrap-up of the SMC on the core. The number of strands visible by color contrast and the degree of strand protrudence through the film are visually observed and given a rating. The visual ratings are given in 5 percent gradients.

Wet-out is visually observed as soon as possible after wrap-up of the SMC and before cutting of the SMC into square foot samples for determination of sheet weight. The wet-out is measured by rolling out the SMC on a table and all dry glass or excess paste is trimmed from the end of the sheet. Three sections, 12–18 inches long, are cut one after another from the compound. Each of these sections are stripped to delaminate the compound on a cross-sectional bias perpendicular to the SMC machine direction and across both test glass products. Any dry strands present appear at the center of the bias. The amount of wet-out is compared to visual standards using 5 percent gradients.

TABLE III

| Samples | % Glass | Wet-Through | Wet-Out |
|---|---|---|---|
| (1) SMC with 516 glass in SMC system of 48,000 centipoise viscosity. | 28.5 | 5[1]/80[2] | 80 |
| (2) SMC with Example 1 sized glass fibers in SMC system of 48,000 centipose. | 28.5 | 10/90 | 85 |
| (3) SMC with 516 glass in SMC system of 50,000 centipose. | 28.4 | 5/85 | 90 |
| (4) SMC with Example 1 sized glass fibers in SMC system of 50,000 centipoise. | 29.2 | 15/95 | 95 |

[1]Measure of initial wet-through before all compaction completed.
[2]Measure of final wet-through just before wrap-up on roll.

In these tests the glass fiber strands were made into SMC using an SMC compounding system of Budd Company at the designated viscosity.

The foregoing description has described a sizing composition used to produce sized glass fiber strands that have improved wet-out performance, good ribbonization, and facile cleanability. The use of these sized glass fiber strands for reinforcing polymeric materials produces a reinforcement with superior compounding and molding characteristics that yields excellent mechanical properties in the finished laminate. The sized glass fiber strands in the form of roving chops cleanly with minimum static, fuzz and flaw to produce a uniform glass fiber strand mat. These properties are achieved using a sizing composition to treat the glass fibers, where the size is substantially insoluble in the matrix polymer by having one or more cross-linkable film formers, and an epoxidized polar thermoplastic copolymer in an amount of 3 to about 12 weight percent of the aqueous sizing composition. The epoxidized polar thermoplastic copolymer has about 3 to about 12 parts of epoxy per 100 parts of the other thermoplastic polymer. The cross-linkable film formers can be water solubilizable unsaturated polyester resin and a water dispensible unsaturated polyester resin. The sizing composition can also have one or more silane coupling agents, emulsifiers, plasticizers and urea formaldehyde condensate polymers. Sized glass fibers having the sizing composition of the present invention can be used to reinforce thermoplastic resins or thermosetting resins. Further glass fibers formed with the sizing composition of the present invention can be used as preformed roving, filament winding, continuous glass fiber mat, chopped strand mat and pultrusion in reinforcing polymeric matrices to have superior reinforcement characteristics.

We claim:

1. An aqueous sizing composition for treating glass fibers to produce sized glass fiber strands for use in reinforcing polymeric materials, comprising:
   (a) a major amount of the solids of the sizing composition being one or more cross-linkable film forming polymers compatible with the polymeric matrix,
   (b) one or more organo-silane coupling agents in an amount up to about 20 weight percent of the solids of the sizing composition,
   (c) an epoxidized polar thermoplastic copolymer selected from the group consisting of epoxidized polyvinylacetate, epoxidized polyacrylate, epoxidized polyurethanes, and epoxidized polyamides, all of which are thermoplastic and have epoxy functionality in an amount of about 3 to about 12 parts per 100 parts of the copolymer in an amount of about 10 weight percent to about 50 weight percent of the nonaqueous solids of the sizing composition, wherein the copolymer has a Tg from about ambient temperature to about 70° C.;
   (d) urea formaldehyde condensate polymer in an amount in the range of about 2 to about 14 weight percent of the nonaqueous solids in the aqueous sizing compounds; and
   (e) an amount of water sufficient to make the percent solids of the sizing composition in the range of about 2 to about 30 weight percent.

2. Aqueous sizing composition of claim 1 wherein the cross-linkable film forming polymer is a water solubilizable unsaturated polyester resin solubilizable with a nitrogenous compound.

3. Aqueous sizing composition of claim 1 where the cross-linkable film forming polymers are a water solubilizable unsaturated polyester polymer and a water dispersible unsaturated polyester polymer wherein the amount of the water dispersible polyester polymer is greater than the amount of the water solubilizable polyester polymer and that the combined amounts of these polyester polymers make up the major portion of the solids of the aqueous sizing composition.

4. Aqeuous sizing composition of claim 1 wherein the organo-silane coupling agent is an amino-organosilane coupling agent.

5. Aqueous sizing composition of claim 1 wherein the amino-silane coupling agent is a gamma-aminopropyl-triethoxysilane.

6. Aqueous sizing composition of claim 1 wherein the organo-silane coupling agents are an amino-organosilane coupling agent and a vinyl containing organo-silane coupling agent.

7. Aqueous sizing composition of claim 1 that includes a plasticizer.

8. Aqueous sizing composition according to claim 1 that includes an emulsifying agent selection from anionic, cationic or nonionic emulsifying agents or mixtures thereof.

9. One or more glass fiber strands having the dried residue of the sizing composition of claim 1.

10. Reinforced polymeric materials selected from sheet molding compounds, bulk molding compounds and thick molding compounds having the glass fiber strands of claim 9 to reinforce the polymeric material.

11. In a process for preparing sized glass fiber roving for use in preparing sheet molding compound, bulk molding compound or thick molding compound, the Improvement comprising:
   (a) treating the glass fibers during their formation with an aqueous sizing composition comprising:
      (1) a major amount of the solids of the sizing composition being one or more cross-linkable film forming polymers compatible with the matrix polymer,
      (2) one or more organo-silane coupling agents in an amount up to 20 weight percent of the solids in the sizing composition,
      (3) an epoxidized polar thermoplastic copolymer in an amount of about 10 to about 50 weight percent of the solids of the aqueous sizing composition, where the epoxy copolymer is selected from epoxypolyvinylacetate, epoxypolyacrylate, epoxypolyurethanes, epoxypolyamides, wherein the amount of epoxy is in the range of about 3 to about 12 parts per 100 parts of the copolymer, and where the epoxy copolymer has a Tg in the range of ambient temperature to about 70° C., and
      (4) urea formaldehyde condensate polymer in an amount in the range of about 2 to about 14 weight percent of the nonaqueous solids in the aqueous sizing compounds;
      (5) a sufficient amount of water to produce an aqueous sizing composition having a solids content in the range of about 2 weight percent to about 30 weight percent;
   (b) gathering the treated glass fibers into one or more treated glass fiber strands,
   (c) drying the treated glass fiber strand or strands at a temperature above about 100° C. for more than one hour to remove almost all of the moisture from the strand or strands, (d) gathering a plurality of dried glass fiber strands, (e) heating the plurality of dried glass fiber strands at a temperature above about 100° C. for a time sufficient to cause the epoxidized polar thermoplastic polymer to flow between the strands, and (f) collecting the plurality of glass fiber strands into a roving package.

12. Process of claim 11 wherein the plurality of dried sized glass fiber strands are collected to produce a roving package and then dried to cause the epoxy copolymer to flow.

13. Process of producing the sizing composition of claim 4 wherein the amino-organo-silane coupling agent is added to one or the other or both of the unsaturated polyester resins while the silane is in the unhydrolyzed or partially hydrolyzed state.

14. In an aqueous sizing composition for sizing glass fibers wherein the composition has a water solubilizable, condensation, cross-linkable, first unsaturated polyester resin, said polyester resin substantially insoluble in aromatic solvents when cross-linked; a second unsaturated water dispersible and insoluble polyester resin, said second polyester being insoluble in said first polyester resin in a water solution, and said second polyester resin preventing the migration of said sizing composition; a plasticizer; a first silane coupling agent to promote adhesion between the glass fibers and the resin matrix, a second silane coupling agent to control the wetting of said glass fibers by said first silane coupling agent; a thermoplastic polymer being of sufficient low molecular weight to impart pressure sensitive adhesive characteristics to said sizing composition; and a major amount of water, the improvement comprising: the thermoplastic polymer being selected from the group consisting of epoxidized polyvinyl acetate copolymer, epoxidized polyacrylate, epoxidized polyurethanes, and epoxidized polyamides all of which are thermoplastic and have about 3 to about 12 parts epoxy to about 100 parts of the copolymer where the copolymer is present in the sizing composition in an amount in the range of about 3 to about 12 weight percent of the aqueous sizing composition.

15. The aqueous sizing composition of claim 14, which includes a gelling agent.

16. Aqueous sizing composition of claim 14, wherein the total solids is in the range of about 2 to about 30 weight percent of the composition.

17. Glass fibers sized with the sizing composition of claim 14.

18. Sizing composition of claim 14, wherein the first silane coupling agent is an amino-functional silane coupling agent.

19. Aqueous sizing composition of claim 14 having present about 0.5 to about 3 weight percent of the aqueous sizing composition of urea formaldehyde condensate polymer.

20. Sizing composition of claim 18 produced by the process of adding an unhydrolyzed or partially hydrolyzed aminofunctional silane to the first and/or second polyester resin.

21. Sizing composition according to claim 14 wherein the water solubilizable unsaturated polyester resin has pendant and terminal carboxyl functionality.

22. Polymeric material reinforced with sized glass fiber strands having the dried residue of the sizing composition of claim 14.

23. An aqueous sizing composition according to claim 14 wherein the water dispersible unsaturated polyester resin is present in an amount greater than the water solubilizable unsaturated polyester resin.

24. An aqueous sizing composition for sizing glass fibers to produce one or more sized glass fiber strands having improved ribbonization and wet-out in preparing glass fiber reinforced polymeric matrices, comprising: in weight percent of the aqueous sizing composition 1 to about 12 weight percent of a water solubilizable, condensation, cross-linkable first unsaturated polyester resin having pendant and terminal carboxyl functionality;

about 2 to about 12 weight percent of a second unsaturated water dispersible and insoluble polyester resin, said second polyester resin being insoluble in said first polyester resin in a water solution and said second polyester resin preventing the migration of said sizing composition and said second polyester always being present in an amount equal to or greater than the first polyester resin, wherein the amount of the first and second polyester resins constitute a major amount of the solids of the aqueous sizing composition;

about 2 to about 12 percent of a plasticizer;

about 0.1 to about 2 weight percent of an amino-functional silane coupling agent;

about 0.1 to about 2 weight percent of a second silane coupling agent to control the wetting of said glass fibers;

about 3 to about 12 weight percent of an epoxidized polyvinyl acetate copolymer wherein there is about 3 to about 12 parts of epoxy per 100 parts of vinyl acetate;

about 0.5 to about 3 weight percent of urea formaldeyde condensate polymer; and a major amount of water.

25. Aqueous sizing composition according to claim 24 or 30 wherein the major amount of water is an amount to give a total solids for the aqueous sizing composition in the range of about 17 to about 25 weight percent.

26. Glass fibers treated with the aqueous sizing composition of claim 25 that are gathered into one or more glass fiber strands and dried to remove most of the moisture.

27. Dried, sized glass fiber strands according to claim 26 gathered into a bundle of strands that are heated to a temperature of around 125° C. for around 4 hours.

28. Reinforced polymeric materials selected from sheet molding compounds, bulk molding compounds and thick molding compounds using unsaturated polyester polymers or vinylester polymers as the matrix polymers and having reinforcement that has the chopped bundles of glass fiber strands of claim 2 or 27.

29. An aqueous sizing composition for treating glass fibers to produce sized glass fiber strands for use in reinforcing polymeric materials, comprising:

(a) a first unsaturated polyester resin, said polyester resin substantially insoluble in aromatic solvents when cross-linked, (b) a second unsaturated water dispersible and insoluble polyester resin which is insoluble in said first polyester resin in a water solution, wherein the amounts of the first polyester resin and second polyester resin constitute a major amount of the solids of the aqueous sizing composition, (c) one or more organo-silane coupling agents in an amount up to about 20 weight percent of the solids in the sizing composition,
(d) an epoxidized polar thermoplastic copolymer selected from the group consisting of epoxidized polyvinylacetate, epoxidized polyacrylate, epoxidized polyurethanes, and epoxidized polyamines, all of which are thermoplastic and in an amount of about 10 weight percent to about 50 weight percent of the solids of the sizing composition, wherein the epoxy copolymer has about 3 to about 12 parts of epoxy per 100 parts of the copolymer and the copolymer has a Tg from about ambient temperature to about 70° C.; and
(e) an amount of water sufficient to make the percent solids of the sizing composition in the range of about 2 to about 30 weight percent.

30. Sizing composition of claim 24 wherein the aminofunctional silane coupling agent is unhydrolyzed or partially hydrolyzed and said silane is added to the first and/or second polyester resin.

* * * * *

UNITED STATES PATENT AND TRADEMARK OFFICE
CERTIFICATE OF CORRECTION

PATENT NO. : 4,338,234

DATED : July 6, 1982

INVENTOR(S) : L. Dow Moore and Balbhadra Das

It is certified that error appears in the above-identified patent and that said Letters Patent are hereby corrected as shown below:

Claim 4, column 14, line 10, should read -- Aqueous sizing composition of Claim 1 or 29,--.

Claim 5, column 14, line 13 should read --Aqueous sizing composition of Claim 1 or 29,--.

Claim 6, column 14, line 16, should read --Aqueous sizing composition of Claim 1 or 29,--.

Claim 7, column 14, line 20, should read --Aqueous sizing composition of Claim 1 or 29,--.

Claim 8, column 14, line 22, should read --Aqueous sizing composition of Claim 1 or 29,--.

Claim 9, column 14, line 26, should read --Aqueous sizing composition of Claim 1 or 29,--.

UNITED STATES PATENT AND TRADEMARK OFFICE
CERTIFICATE OF CORRECTION

PATENT NO. : 4,338,234

DATED : July 6, 1982

INVENTOR(S) : L. Dow Moore and Balbhadra Das.

It is certified that error appears in the above-identified patent and that said Letters Patent are hereby corrected as shown below:

Claim 24, line 16 of the application should read,
—about 2 to about 12 weight percent of a plasticizer—
at column 16, line 26.

Claim 24, line 24 in the application, "formaldeyde" should
read —formaldehyde— at column 16, line 36.

Signed and Sealed this

Eighth Day of February 1983

[SEAL]

Attest:

GERALD J. MOSSINGHOFF

Attesting Officer

Commissioner of Patents and Trademarks